United States Patent Office 3,375,037
Patented Mar. 26, 1968

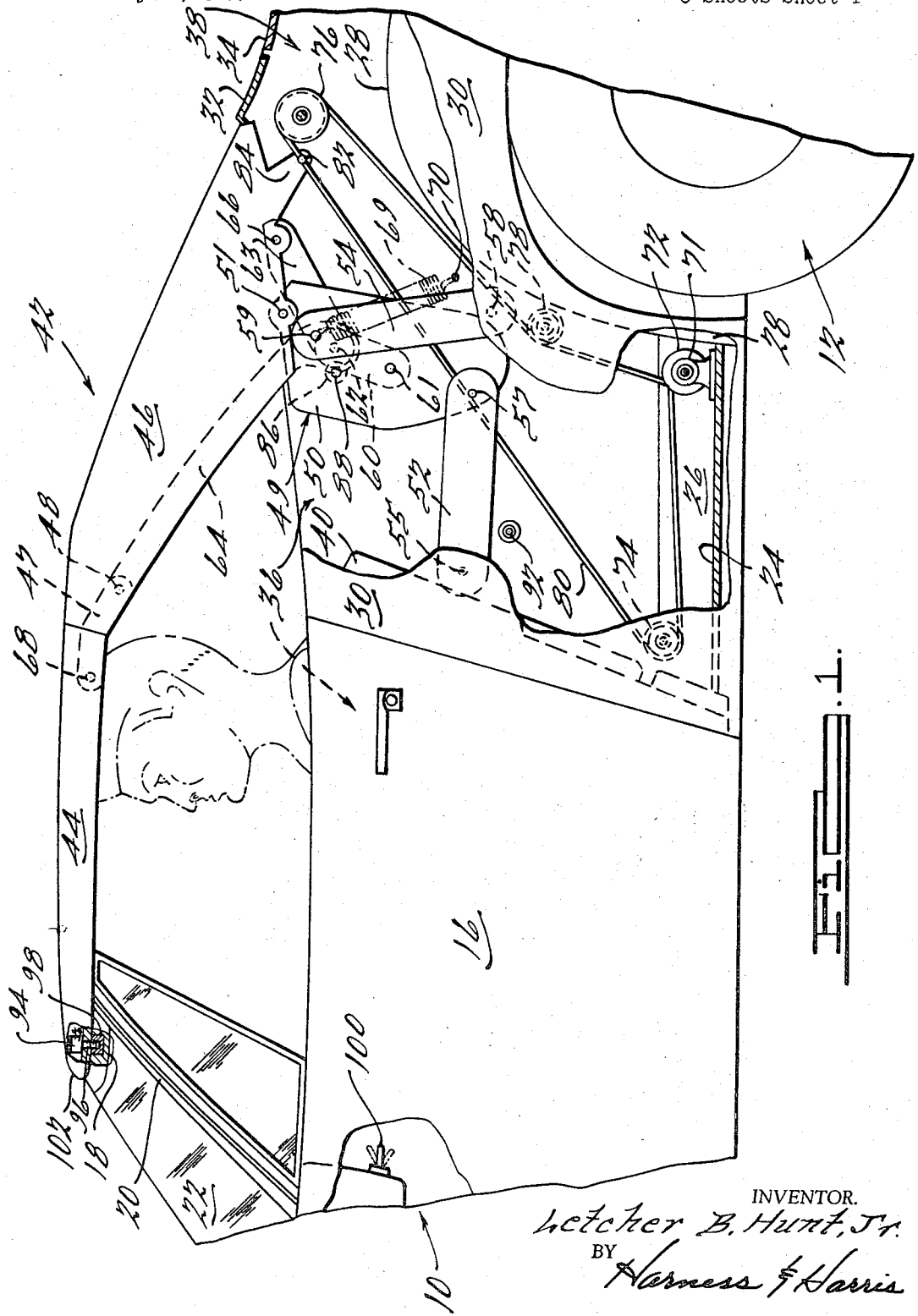

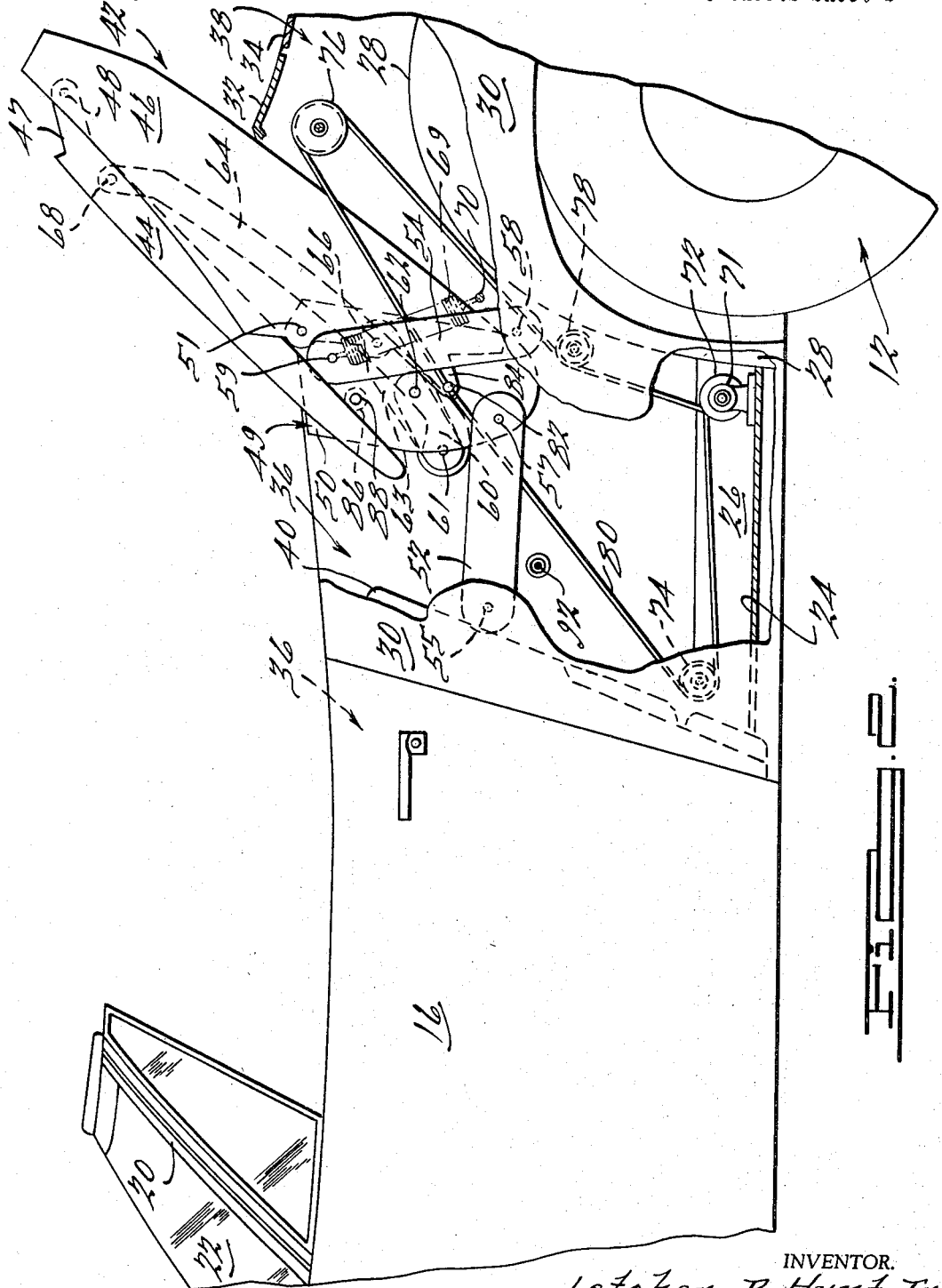

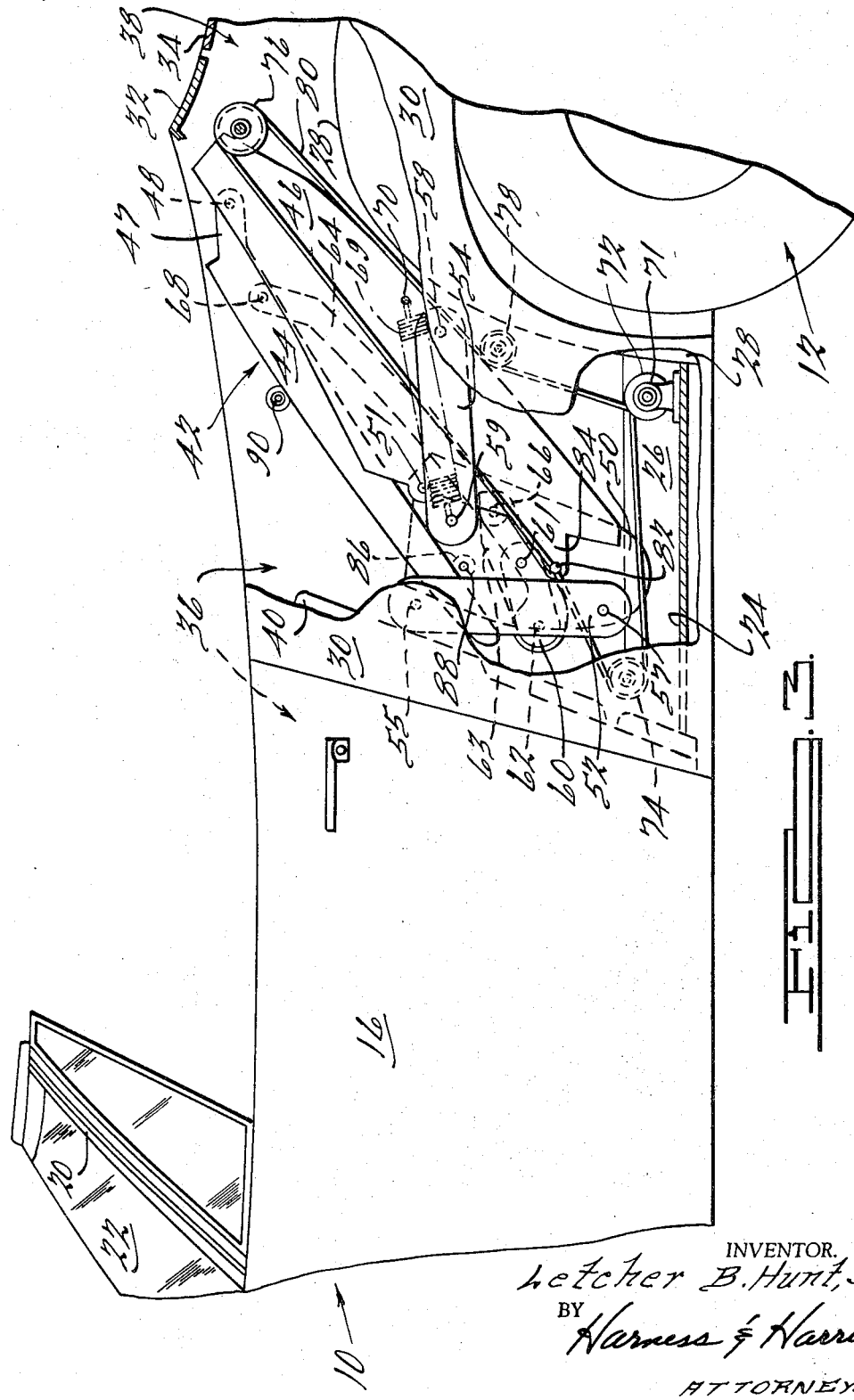

3,375,037
RETRACTABLE HARDTOP
Letcher B. Hunt, Jr., Rochester, Mich., assignor to Chrysler Corporation, Highland Park, Mich., a corporation of Delaware
Filed May 23, 1966, Ser. No. 552,001
8 Claims. (Cl. 296—117)

ABSTRACT OF THE DISCLOSURE

A retractable hardtop roof structure for an automobile including a rearward section and at least one forward section; to move the roof from its raised to its stowed position, the forward roof section is folded in accordion fashion against the rearward roof section while simultaneously rotating the rearward roof section backwardly about a generally horizontal axis, whereafter the forward and rearward roof sections are dropped as a unit substantially directly downwardly into the area immediately behind the seat of the automobile.

---

This invention relates to motor vehicle bodies. More particularly, it relates to an automobile of the retractable hardtop type.

It is an object of the present invention to provide an improved retractable hardtop mechanism for an automobile.

Another object is to provide an improved method of moving an articulated automobile roof between its extending working position overlying the passenger compartment to its stowed position rearwardly of the seat means within the passenger compartment.

According to the invention, the articulated roof comprises a rearward section and at least one forward section; to move the roof from its raised to its stowed position, the forward roof section is folded in accordion fashion against the rearward roof section while simultaneously rotating the rearward roof section backwardly about a generally horizontal axis, whereafter the forward and rearward roof sections are dropped as a unit substantially directly downwardly into the area immediately behind the seat means.

The mechanism of the retractable hardtop structure of the invention includes a carrier member to which the rearward roof section is pivotally secured; the carrier member is mounted for movement between a raised position generally rearwardly of the seat means and a lowered position generally beneath its raised position and between the seat means and the luggage compartment of the vehicle. With the carrier member in its raised position, the roof sections may be extended to form a continuous rigid roof overlying the passenger compartment; to lower the roof structure, the roof sections may be moved to their relatively folded positions, whereafter the carrier member may be dropped to its lowered position to move the roof sections as a unit into their stowed position immediately behind the seat means.

These and other objects, features and advantages of the invention will be apparent from the following detailed description of a preferred embodiment of the invention and from the accompanying drawings wherein:

FIG. 1 is a fragmentary side elevational view of a motor vehicle having a retractable roof according to the invention, the roof being shown its raised or working position overlying the passenger compartment;

FIG. 2 is a view similar to FIG. 1 but showing the roof in a partially retracted position; and FIG. 3 is a view similar to FIG. 1 but showing the roof in its fully retracted or stowed position.

The motor vehicle seen fragmentarily in the drawings includes a body structure 10, rear wheels 12, and front wheels, not shown.

Body structure 10 includes doors 16, a header 18 and pillars 20 mounting a windshield 22, floor 24, drive shaft tunnel 26, wheel housing 28, rear quarter panels 30, upper deck panel 32, and deck lid 34.

Doors 16, windshield 22, floor 24, quarter panels 30 and upper deck panel 32 cooperate to define a passenger compartment 36 disposed generally forwardly of the rear wheels 12.

Deck lid 34 is hinged in known manner to body structure 10 to provide access to the usual luggage compartment 38 defined within quarter panels 30 generally rearwardly of rear wheels 12.

Seat means 40, which may comprise a single bench seat or side-by-side bucket seats, are disposed within passenger compartment 36.

An articulated roof structure, seen generally at 42, is adapted to selectively overlie passenger compartment 36. Roof structure 42 includes a forward section 44 and a rearward section 46. Rearward section 46 defines the rear body pillar, or C pillar, of the roof structure. Forward roof section 44 includes a pair of rearwardly projecting lugs 47 by which section 44 is pivotally connected at 48 to rearward roof section 46.

Roof structure 42 is moved between its raised and lowered positions by a pair of retracting assemblies 49. An assembly 49 is located immediately inboard of each quarter panel 30, although only the near assembly 49 is shown in the drawing. It will be understood that a similar retracting assembly of opposite hand is located adjacent the remote quarter panel 30. Hence, the following description of near assembly 49 is equally applicable to the remote retracting assembly.

Assembly 49 includes a carrier member 50 in the form of a vertically elongated plate. Rearward roof section 46 is pivotally secured at 51 to the upper end of carrier 50. A pair of guide links 52, 54 support carrier member 50 and guide its retracting movement. One end of link 52 is pivotally secured at 55 to the adjacent quarter panel structure. The other end of link 54 is pivotally secured at 57 to the lower end of carrier member 50. One end of link 54 is pivotally secured at 58 to the adjacent quarter panel structure. The other end of link 54 is pivotally secured at 59 to the upper end of carrier member 50.

A central folding control link 60 is pivotally secured at one end to carrier member 50 at a point 61 located vertically between the pivotal connections of links 52, 54. The other end of link 60 is pivotally connected at 62 to one end of a rearward folding control link 63 and to one end of a forward folding control link 64. The other end of control link 63 is pivotally connected at 66 to the lower side edge of roof section 46 at a location thereon spaced rearwardly of pivotal connection 51. The other end of control link 64 is pivotally connected at 68 to forward roof section 44. Assembly 49 further includes a coil spring 69 extending between pivot point 59 and a point 70 on the rear quarter panel structure.

A power assembly is provided for each retracting assembly 48. Only the near power assembly is seen in the drawings. Each power assembly includes a motor 71, a pulley 72 driven by motor 71, a lower directional pulley 74 journaled in the adjacent quarter panel structure rearwardly of seat means 40, an upper directional pulley 76 journaled in the adjacent quarter panel structure directly below upper deck panel 32, an idler pulley 78 journaled in the adjacent quarter panel structure generally above drive pulley 72, and an endless cable 80 wrapped around and suitably fastened to drive pulley 72 and trained around pulleys 74, 76 and 78. Cable 80 is securely fastened at 82 to the free end of a lug 84 depending integrally from the lower side edge of rearward roof section 46.

Alternatively, dual motors 71 may be replaced with a single central motor driving left and right pulleys 72 through flexible shafts.

Each power assembly further includes a small motor 86 mounted on carrier 50 and driving, through a reduction gearing (not shown), a screw 88. Screw 88 is adapted to selectively cooperate with threaded sockets 90, 92 provided at vertically spaced locations in the quarter panel structure. The sockets 90, 92 seen in the drawings are actually part of the remote power assembly since the near quarter panel structure has been broken away for purposes of clarity.

Each power assembly further includes a small motor 94 mounted at the forward end of forward roof section 44 and driving, through a reduction gearing (not shown), a screw 96. Screw 96 is adapted to cooperate with a threaded socket 98 in windshield header 18. It will be understood that more than one screw and socket assembly 96, 98 may be provided and that a single central motor may be provided to drive the several screw locks through flexible shafts.

Operation

Roof structure 42 is maintained in the raised position of FIG. 1 by the threaded, locking engagement of screw and socket assemblies 96, 98 and screw and socket assemblies 88, 90. In its raised or working position, rearward roof section 46 forms the C pillar of the roof structure and sealingly engages the forward transverse edge of upper deck panel 32 and the upper longitudinal inner side edges of the respective quarter panel assemblies to provide a seal between roof structure 42 and body structure 10.

Operation of the retracting mechanism may be controlled, for example, by a single instrument panel mounted switch 100 spring loaded to neutral position. It will be understood that switch 100 is part of an electrical circuit (not shown) which functions in known manner through a series of relays and limite switches to produce the sequence of operation hereinafter described.

Upon initial depression of switch 100, motor 94 is energized to withdraw screw 96 from engagement with threaded header socket 98, thereby releasing the roof structure from the windshield header. Thereafter, motor 71 is energized in a sense to move cable 80 downwardly from pulley 76 toward pulley 74. This moves cable attachment point 82 in an arc centered on pivot axis 51, thereby rotating rearward roof section 46 backwardly, or clockwise, about axis 51. Carrier 50, and thereby axis 51, is held stationary at this time by the threaded, locking engagement of screw 88 in socket 90. As roof section 46 rotates backwardly, rearward folding control link 63 is driven generally forwardly, thereby rotating central folding control link 60 forwardly about axis 61 and thereby moving the lower end of forward folding control link 64 along an arc centered on axis 61. The movement of the lower end of link 64 along this arc, combined with the simultaneous backward rotating movement of rearward roof section 46, causes forward roof section 44 to pivot downwardly, or counterclockwise, about axis 48 and undergo a folding or collapsing movement relative to the backwardly rotating section 46.

This simultaneous backward rotation of section 46 about axis 51 and counterclockwise pivotal movement of section 44 about axis 48 enables the forward or lower end 102 of roof section 44 to clear the head of an occupant of seat means 40. This simultaneous movement continues until the roof sections reach their intermediate positions of FIG. 2. In this position, rearward roof section 46 extends generally upwardly and slightly rearwardly, and forward roof section 44 is folded in accordion fashion tightly against section 46 to form therewith a relatively compact unit.

As roof sections 44, 46 reach their position of FIG. 2 a limit switch (not shown) is tripped to interrupt power to motor 71; immediately thereafter, motor 86 is energized to withdraw screw 88 from threaded engagement with socket 90 and free carriage 15 from body structure 10. Following withdrawal of screw 88, motor 71 is re-energized to again move cable 80 downwardly toward pulley 74. The renewed pull of cable 80 at point 82 now causes carriage 50, together with relatively collapsed roof sections 44, 46 to move as a unit substantially directly downwardly into the area immediately behind seat means 40 and generally forwardly of wheel housing 28 and rear wheels 12.

The carriage and roof assembly is guided in its downward movement to the position of FIG. 3 by guide links 52, 54 with pivot point 59 on link 54 tracing an arc about axis 58 and pivot point 57 on link 52 tracing an arc about pivot point 55. As a result, carriage 50 moves from its raised position of FIG. 2 to its lowered position of FIG. 3 in generally translatory fashion with a slight amount of counterclockwise rotation occurring during the first portion of the downward cycle and a slight amount of compensating clockwise movement occurring during the latter part of the downward cycle.

As carriage 50 reaches its position of FIG. 3, a limit switch (not shown) is tripped to interupt power to motor 71; immediately thereafter motor 86 is energized in a sense to thread screw 88 into socket 92 and thereby lock the carriage and roof assembly in its stowed position. Coil spring 69 is extended during movement of carriage 50 from its FIG. 2 to its FIG. 3 position so that, with the carriage and roof assembly stowed, spring 69 exerts a continual upward force tending to move the assembly upwardly toward its intermediate position of FIG. 2.

To raise the top, screw 88 is first withdrawn from socket 92, whereafter motor 71 is enegrized in a sense to raise carriage 50 to its intermediate position of FIG. 2. Coil spring 69 contracts to assist in this upward movement. Power to motor 71 is then interrupted, whereafter screw 88 is threaded into socket 90 to lock carriage 50 to body structure 10. Motor 71 is then re-energized to move roof structure 42 to its extended position of FIG. 1 overlying passenger compartment 36, whereafter motor 94 is energized to thread screw 96 into socket 98 and lock the roof to windshield header 18.

Although a preferred embodiment of the invention has been illustrated and described in detail, it will be apparent that changes and modifications may be made in the disclosed embodiment without departing from the scope of spirit of the invention as defined by the appended claims. For example, although a pulley and cable system has been described as the power mechanism for the roof structure, it will be apparent that other systems, such for example as a hydraulic jack and bell-crank assembly, may be used to practice the invention.

I claim:

1. A method of moving an articulated automobile roof, comprising a rearward section and at least one forward section, from its raised position in which the several roof sections are extended to form a continuous roof overlying the passenger compartment to its stowed position rearwardly of the seat means within the passenger compartment, comprising the steps of
   (A) folding the said at least one forward roof section in accordion fashion against the rearward roof section;
   (B) rotating the rearward roof section backwardly about a generally horizontal pivot axis; and
   (C) moving said pivot axis, together with said rearward and forward roof sections, substantially directly downwardly into the area immediately behind said seat means.

2. The method of claim 1 wherein steps A and B are performed substantially simultaneously, whereafter step C is performed.

3. The method of claim 1 wherein the area into which said forward and rearward roof sections are moved in step C is generally forwardly of the rear wheels of said automobile.

4. The method of claim 2, and further including the steps of
   (D) maintaining said horizontal axis in a fixed position during the simultaneous performance of steps A and B,
   (E) thereafter releasing said axis to allow the downward movement of step C, and
   (F) thereafter fixing said axis again to inhibit movement of said roof sections in the stowed position of the latter.

5. A motor vehicle comprising
   (A) front wheel means;
   (B) rear wheel means;
   (C) a body structure defining a passenger compartment generally forwardly of said rear wheel means and a luggage compartment generally rearwardly of said rear wheel means;
   (D) seat means positioned within said passenger compartment;
   (E) a carrier member;
   (F) an articulated roof structure comprising at least two rigid sections, one of which defines the C pillar portion of said roof structure;
   (G) means pivotally securing said one section to said carrier member;
   (H) means mounting said other section for pivotal movement relative to said one section between a working position in which it forms an extension of said one section and forms with that section a continuous roof surface and a collapsed position in which it is folded relative to said one section; and
   (I) means mounting said carrier member for movement between a raised position generally rearward of said seat means and a lowered position generally beneath said raised position and between said seat means and said luggage compartment, whereby with said carrier member in its raised position said roof sections may assume their extended working position to form a rigid roof overlying said passenger compartment and said roof structure may be lowered to a stowed position behind said seat means by first moving said sections to their relatively folded position and thereafter dropping said carrier member to its lowered position.

6. A motor vehicle according to claim 5 and further including
   (J) means operative in either of the aforesaid positions of said carriage to selectively lock and unlock said carriage to and from said body structure, whereby said carriage may be locked to said body structure during movement of said roof sections from their extending working position to their relatively folded position, then unlocked from said body structure to allow the carrier to drop to its lowered position, and thereafter relocked to said body structure to inhibit movement of said roof structure in the stowed position of the latter.

7. A motor vehicle according to claim 5 wherein
   (J) said one section in the raised position of said roof structure defines
      (1) a lower, longitudinal edge portion sealingly engaging the adjacent belt line of said body structure and
      (2) an upper end portion overlying said passenger compartment;
   (K) said other section is elongated and defines, in the raised position of said roof structure, a forward end and a rearward end;
   (L) the means pivotally securing said one section to said carriage comprises a pivotal interconnection between said longitudinal edge portion and said carriage; and
   (M) the means mounting said other section for pivotal movement relative to said one section comprises a pivotal interconnection between the rearward end of said other section and the forward end portion of said one section.

8. A motor vehicle according to claim 7 and further including
   (N) control means operative to rotate said one section backwardly on its pivot axis on said carriage while simultaneously pivoting said other section downwardly about its pivot axis on said one section toward a collapsed position folded against said one section.

References Cited

UNITED STATES PATENTS

| | | | |
|---|---|---|---|
| 2,007,873 | 7/1935 | Paulin | 296—117 |
| 2,812,975 | 11/1957 | Warner | 296—117 |
| 2,939,742 | 6/1960 | Dardarian et al. | 296—117 X |

LEO FRIAGLIA, *Primary Examiner.*

BENJAMIN HERSH, *Examiner.*

C. C. PARSONS, R. SONG, *Assistant Examiners.*